United States Patent
Zaltsman et al.

(10) Patent No.: US 10,103,927 B2
(45) Date of Patent: Oct. 16, 2018

(54) SYSTEM AND METHOD FOR DISTRIBUTION OF BROADCAST CHANNELS

(71) Applicant: Harmonic, Inc., San Jose, CA (US)

(72) Inventors: Ariel Zaltsman, Raanana (IL); Boris Brun, Haifa (IL); Guy Levy, Pardes Hana-Carcur (IL)

(73) Assignee: Harmonic, Inc., San Jose, CA (US)

( * ) Notice: Subject to any disclaimer, the term of this patent is extended or adjusted under 35 U.S.C. 154(b) by 363 days.

(21) Appl. No.: 14/534,530

(22) Filed: Nov. 6, 2014

(65) Prior Publication Data

US 2016/0134459 A1    May 12, 2016

(51) Int. Cl.
*H04L 27/36* (2006.01)
*H04H 20/33* (2008.01)
*H04H 20/77* (2008.01)

(52) U.S. Cl.
CPC ............. *H04L 27/36* (2013.01); *H04H 20/33* (2013.01); *H04H 20/77* (2013.01)

(58) Field of Classification Search
CPC ............... H04L 1/06; H04L 1/22; H04L 27/20
USPC ......................................................... 725/71
See application file for complete search history.

(56) References Cited

U.S. PATENT DOCUMENTS

| | | | | |
|---|---|---|---|---|
| 5,854,813 A * | 12/1998 | Rottinghaus | ............ | H04L 27/20 332/103 |
| 2004/0028146 A1* | 2/2004 | Winkler | .............. | H04L 27/2626 375/260 |
| 2004/0142696 A1 | 7/2004 | Saunders et al. | | |
| 2008/0240275 A1 | 10/2008 | Cai | | |
| 2008/0316912 A1 | 12/2008 | Al Adnani | | |
| 2009/0046790 A1 | 2/2009 | Soliman | | |
| 2009/0049492 A1* | 2/2009 | Pantelias | ............. | H04L 12/2801 725/109 |
| 2010/0109928 A1 | 5/2010 | Chen | | |
| 2010/0232395 A1 | 9/2010 | McLeod et al. | | |
| 2011/0110401 A1* | 5/2011 | Leong | ................ | H04B 7/18515 375/211 |
| 2011/0211541 A1 | 9/2011 | Yuk et al. | | |
| 2012/0120911 A1 | 5/2012 | Miyoshi et al. | | |
| 2013/0034189 A1 | 2/2013 | Ye | | |
| 2014/0169501 A1 | 6/2014 | Nazarathy et al. | | |
| 2014/0373076 A1* | 12/2014 | Lerner | ............... | H04N 21/6156 725/71 |

* cited by examiner

*Primary Examiner* — Natasha W Cosme
(74) *Attorney, Agent, or Firm* — Brokaw Patent Law PC; Christopher J Brokaw

(57) ABSTRACT

A distribution system that may include multiple radio frequency outputs, a group of channel processing and digital up conversion units, and a set of digital to analog converters. The set of digital to analog converters is coupled between the group of channel processing and digital up conversion units and the multiple radio frequency outputs. The group of channel processing units may be arranged to generate multiple digital multiplexes and to provide the multiple digital multiplexes to the set of digital to analog converters. Each digital multiplex comprises digital broadcast channels provided from at least two channel processing and digital up conversion units. The set of the digital to analog converters may be arranged to convert the multiple digital multiplexes to provide multiple analog multiplexes and to provide the multiple analog multiplexes to the multiple radio frequency outputs.

20 Claims, 8 Drawing Sheets

SYSTEM AND METHOD FOR DISTRIBUTION OF BROADCAST CHANNELS

FIELD OF THE INVENTION

Embodiments of the invention generally relate to distributing digital broadcast channels.

BACKGROUND OF THE INVENTION

Converged Cable Access Platform (CCAP) is a standard that was originated by Cable Labs of USA and relates to communication networks. Edge QAM (quadrature amplitude modulation) systems, such as the NSG™ 9000-40G HectoQAM® by Harmonic, Inc. headquartered in San Jose, Calif., are digital video gateways for multiplexing on-demand content streamed over an Internet protocol (IP) networks.

CCAP applications or edge QAM applications require multiple port systems that have multiple radio frequency ports. Each radio frequency output port should transmit both narrowcast QAM channels and analog broadcast QAM channels. An analog narrowcast QAM channel is transmitted to a specific port of the system while an analog broadcast QAM channel is transmitted to several ports.

There is a growing need for an agile system that is capable of efficiently distributing the content of analog broadcast QAM channels.

SUMMARY

According to an embodiment of the invention there may be provided a distribution system that may include multiple radio frequency outputs, a group of channel processing and digital up conversion units, and a set of digital to analog converters. The set of digital to analog converters may be coupled between the group of channel processing and digital up conversion units and the multiple radio frequency outputs. The group of channel processing units may be arranged to generate multiple digital multiplexes and to provide the multiple digital multiplexes to the set of digital to analog converters. Each digital multiplex comprises digital broadcast channels provided from at least two channel processing and digital up conversion units. The set of the digital to analog converters may be arranged to convert the multiple digital multiplexes to provide multiple analog multiplexes and to provide the multiple analog multiplexes to the multiple radio frequency outputs.

The distribution group of channel processing units and digital up conversion units may be arranged to output multiple digital broadcast channels so that each digital broadcast channel is sent, after being digital to analog converted by a digital to analog converter of the set, to each one of the multiple radio frequency outputs.

The channel processing units and digital up conversion units of the group may be arranged to distribute multiple digital broadcast channels between the channel processing units and digital up conversion units of the group.

Each digital multiplex may include digital broadcast channels provided from each one of the channel processing and digital up conversion units of the group.

Channel processing units and digital up conversion units of the group may be arranged to distribute partially channel processed digital broadcast channels between the channel processing units and digital up conversion units of the group.

Channel processing units and digital up conversion units of the group may be arranged to generate partially channel processed digital broadcast channels by performing at least one out of scrambling, forward error correction and a portion of channel modulation.

Each digital multiplex may include at least one narrowband channel.

Each channel processing and digital up conversion unit of the group may include: digital broadcast channel generators arranged to generate inner digital broadcast channels, at least one digital broadcast channel input for receiving at least one input digital broadcast channels from at least one other channel processing and digital up conversion units of the group, at least one digital broadcast channel output for outputting at least one inner digital broadcast channel to one or more other channel processing and digital up conversion units of the group, and an interfacing unit that may be arranged to receive a plurality of digital broadcast channels that may include the inner digital broadcast channels and the at least one input digital broadcast channels and to provide the plurality of digital broadcast channels to a digital up converter unit of the channel processing and digital up conversion unit.

Different channel processing and digital up conversion units of the group may be of a same configuration. The configuration of channel processing and digital up conversion units may be indicative of at least a connectivity between the digital broadcast channel generators, the at least one digital broadcast channel input, the at least one digital broadcast channel output, and the interfacing unit.

The interfacing unit may include a router. The router may include multiple router inputs, multiple router outputs, and a routing circuit coupled between the multiple router inputs and the multiple router outputs. The multiple router outputs are coupled to multiple digital up converter inputs of a digital up converter unit of the channel processing and digital up conversion units. The different DUC inputs may be associated with different frequency ranges.

The order of provision of samples of narrowband samples to each DUC input of the multiple DUC inputs may determine an allocation of frequencies by the DUC to the samples of the narrowband channels within a frequency range associated with the DUC input.

The channel processing and digital up conversion units of the group may include quadrature amplitude modulation (QAM) modulators.

In an embodiment, each channel processing and digital up conversion unit of the group generates the same number of digital broadcast channels as any other channel processing and digital up conversion unit of the group.

In an embodiment, at least two channel processing and digital up conversion units of the group differ from each other by a number of digital broadcast channels generated by each one of the at least two channel processing and digital up conversion units.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

Figure 1:
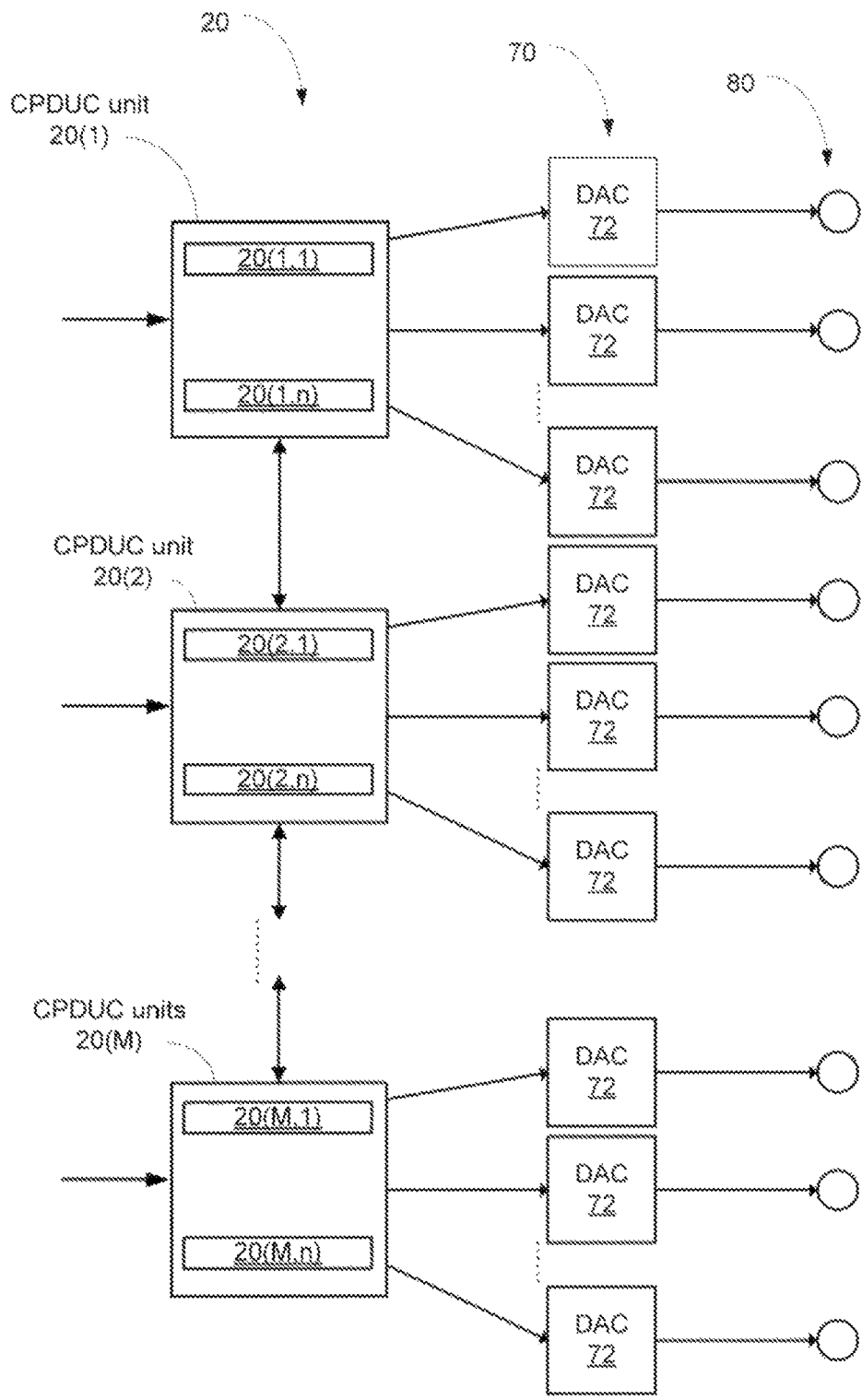
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Any reference in the specification to a method should be applied mutatis mutandis to a system capable of executing the method. Any reference in the specification to a system should be applied mutatis mutandis to a method that may be executed by the system.

The term "narrowband channel" refers to a channel that is narrower than a broadcast channel. The bandwidth of a narrowband channel can be less than a bandwidth threshold. The bandwidth threshold may, for example, not exceed 20 Megahertz.

Narrowband channels and broadcast channels are digitally modulated by channel modulation. The channel modulation may be aimed to overcome noise and other disturbances introduced to information conveyed by the channel when the information is transmitted over a medium. For simplicity of explanation it is assumed that the channel modulation is quadrature amplitude modulated (QAM) modulation. It is noted that other channel modulations can be applied.

An inner digital channel is a digital channel that is generated by a channel processor and is fed to a digital up converter where the channel processor and the digital up converter belong to the same channel processing and digital up conversion unit.

An outer digital channel is a digital channel that is generated by a channel processor and is fed to a digital up converter where the channel processor and the digital up converter belong to different channel processing and digital up conversion units.

A channel may refer to content that is conveyed over a frequency range.

A channel processing and digital up conversion (CPDUC) unit is a unit (including at least one hardware component) that performs channel modulation and digital up conversion.

Figure 2:
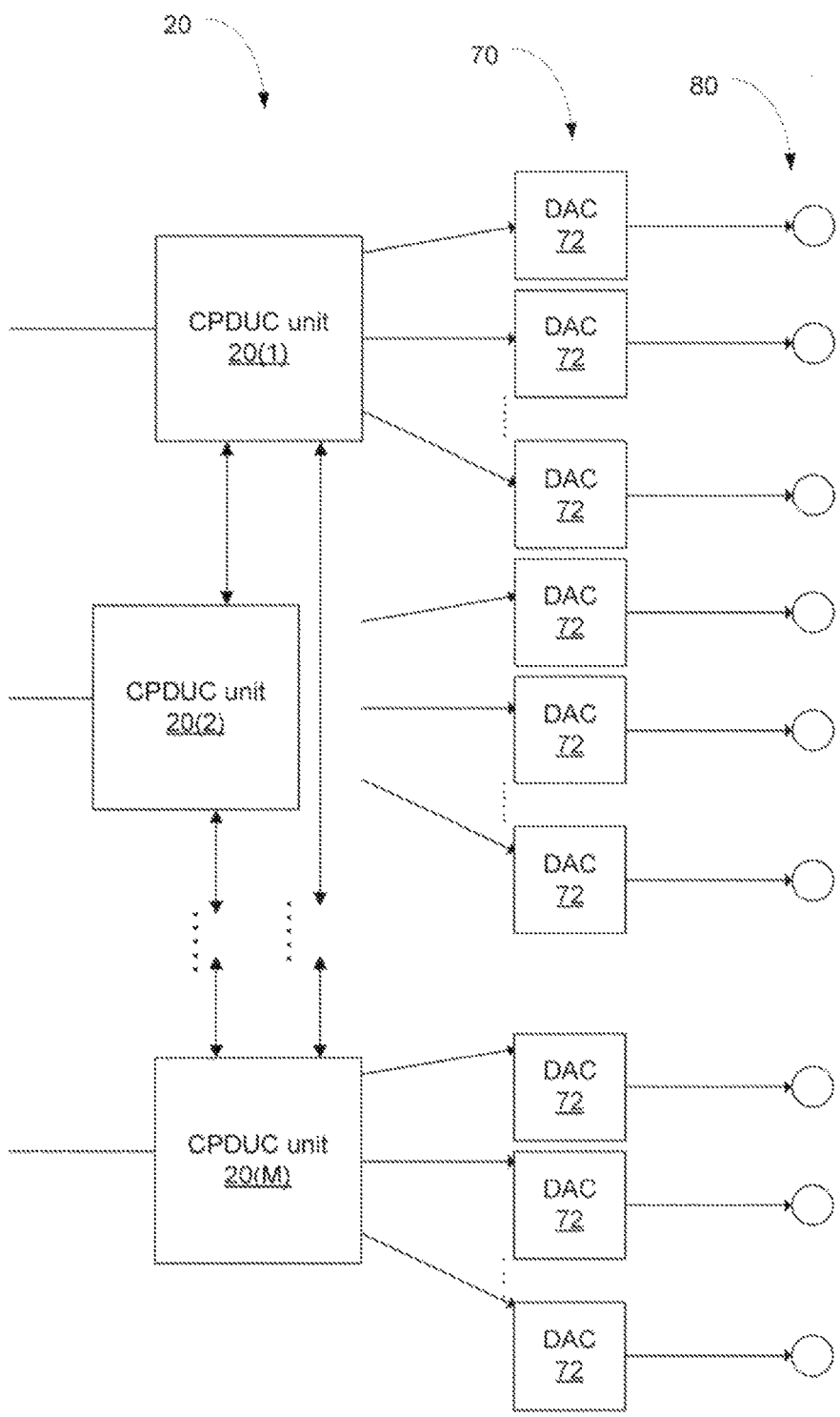
FIG. 2 illustrates a system according to an embodiment of the invention.

A CPDUC unit may include multiple digital up converters (DUCs) and output ports (as shown in FIGS. 1 and 2). Alternatively, a CPDUC unit may include a single DUC unit and a single port.

FIGS. 1 and 2 illustrate distribution system 10 according to various embodiments of the invention. FIG. 1 illustrates CPDUC units that receive digital broadcast channels from their adjacent CPDUC units while FIG. 2 illustrates that each CPDUC unit receives digital broadcast channels from all other CPDUC units. Each CPDUC unit may include one or more integrated circuits. Alternatively, multiple CPDUC units may be implemented on a single integrated circuit.

Either one of these distribution systems may be arranged to send digital broadcast channels from one CPDUC unit to another. These digital broadcast channels may be fully channel processed (to provide fully channel processed digital broadcast channels), partially channel processed digital broadcast channels (to provide partially channel processed digital broadcast channels), or a combination of both—where some digital broadcast channels are fully channel processed and some are only partially channel processed.

Figure 3:
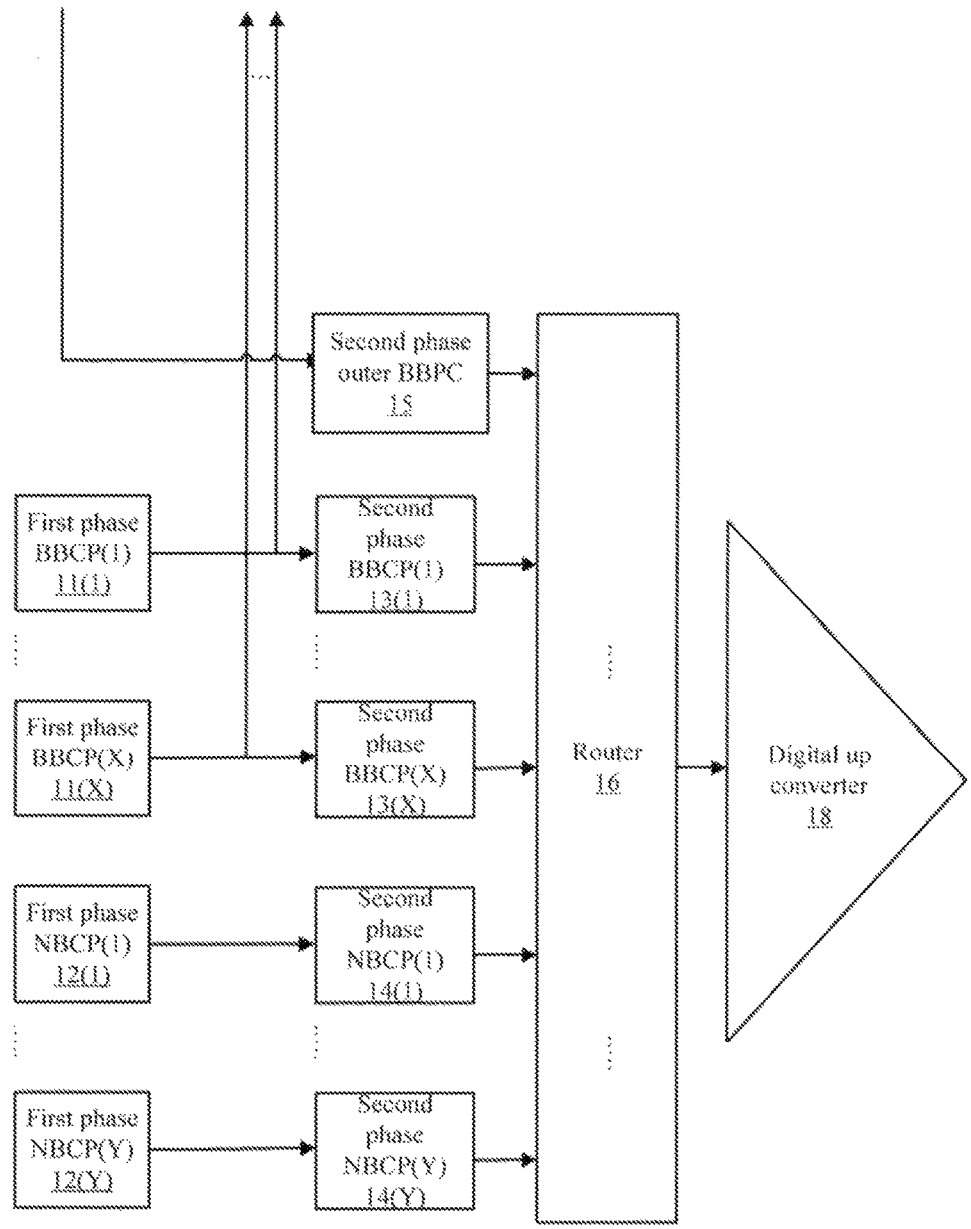
FIG. 3 illustrates a branch of a system according to an embodiment of the invention.
Figure 4:
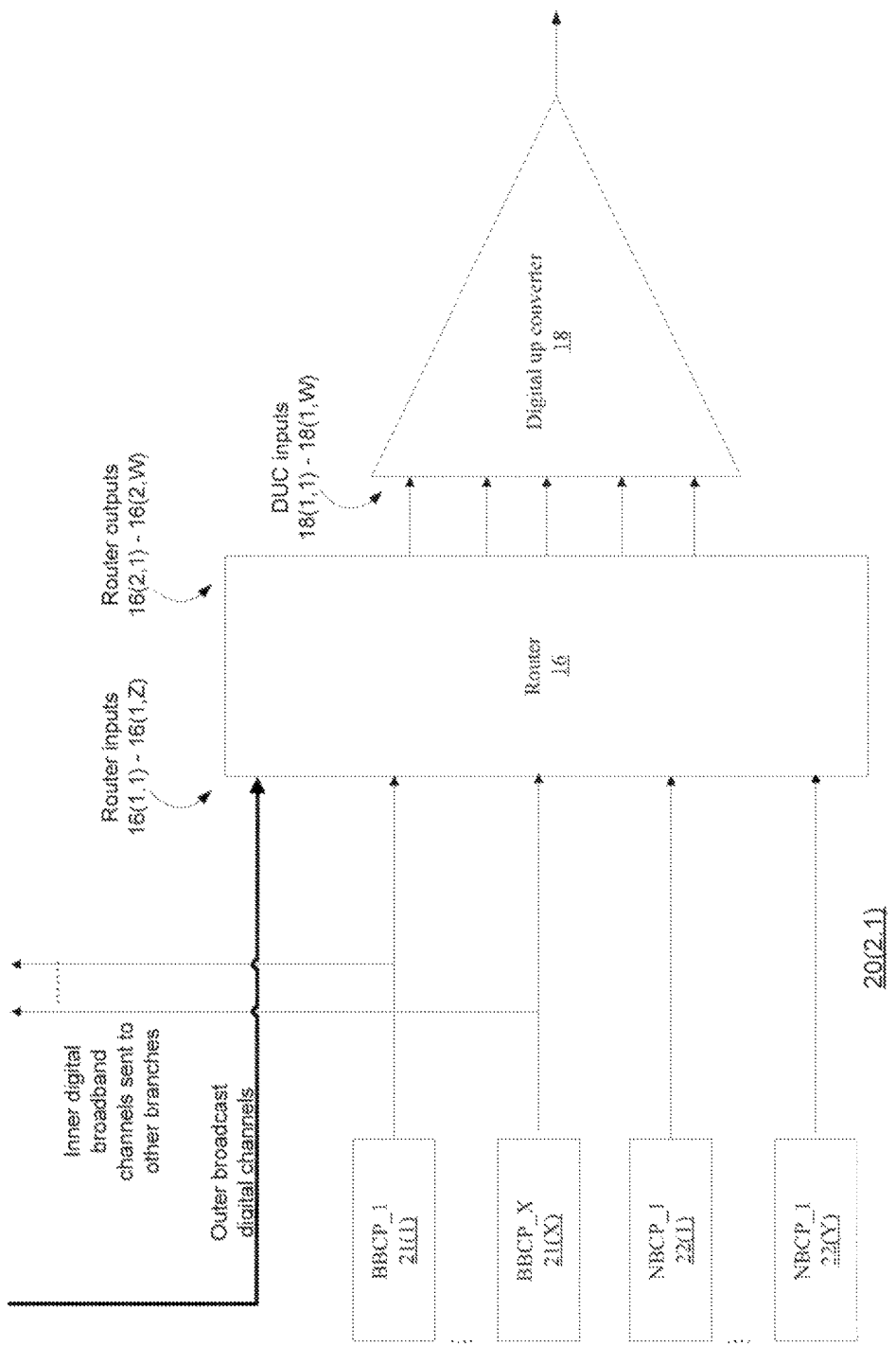
FIG. 4 illustrates a branch of a system according to an embodiment of the invention.
Figure 6:
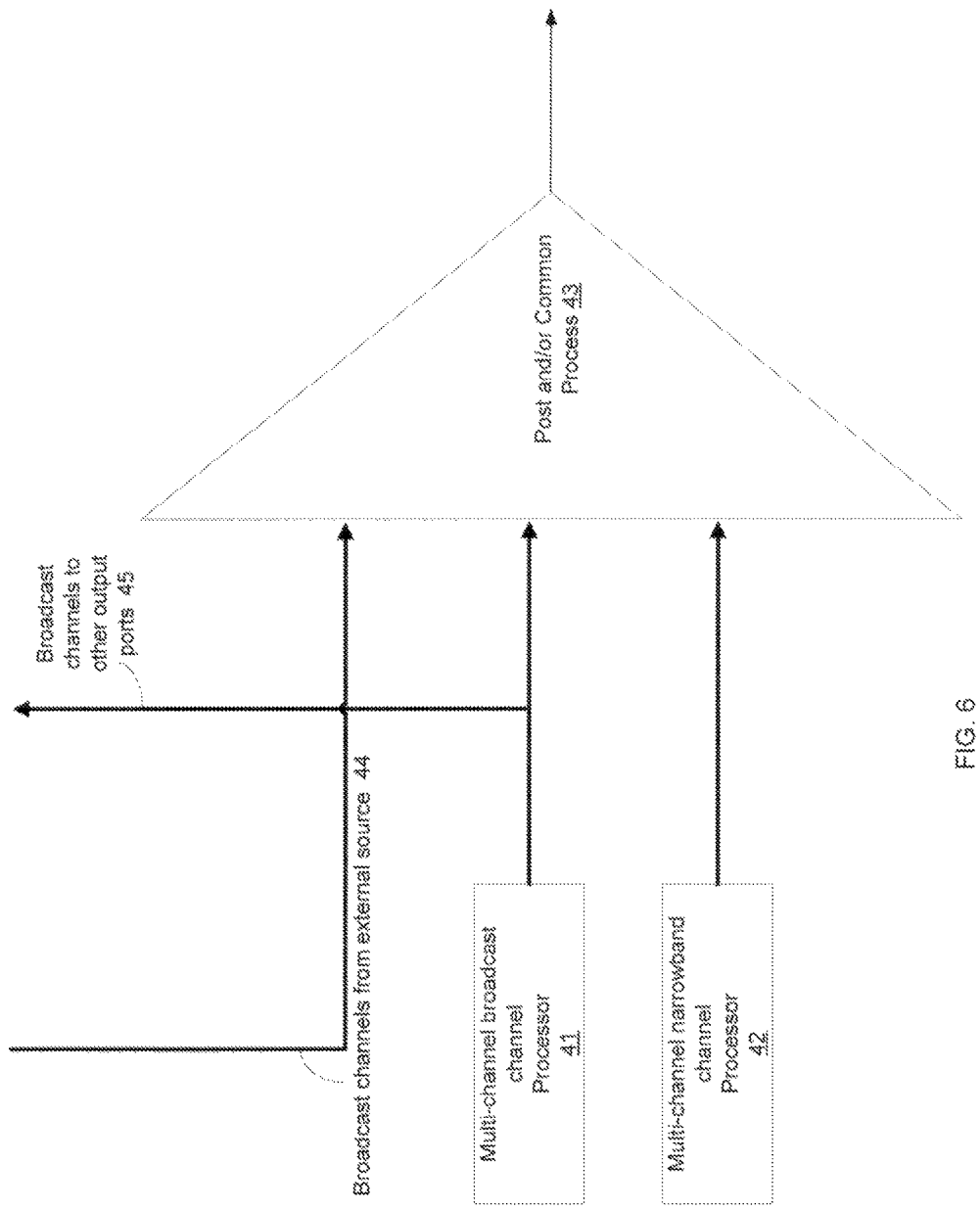
FIG. 6 illustrates a branch of a system according to an embodiment of the invention.

Partially channel processing is illustrated in FIG. 3 and full channel processing is illustrated in FIGS. 4 and 6.

When a CPDUC unit receives a partially channel processed digital broadcast channel it completes the channel processing of that channel to provide a fully channel processed digital broadcast channel.

Figure 5:
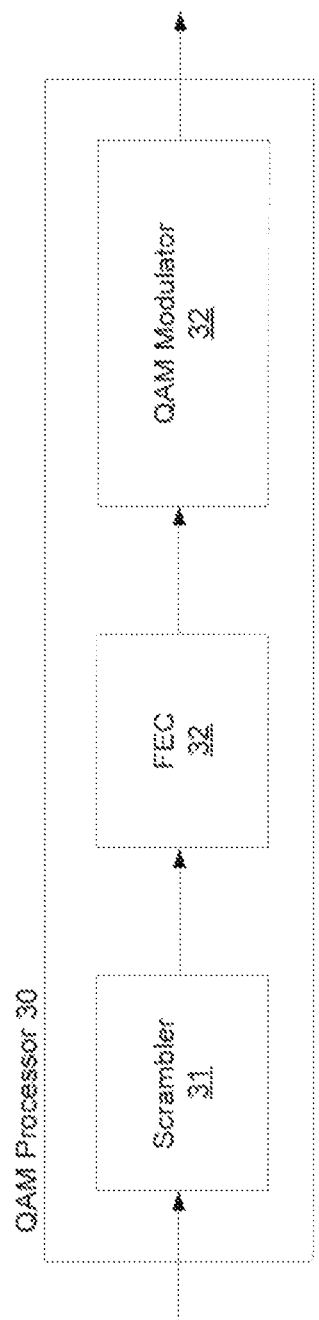
FIG. 5 illustrates a QAM modulator.

If, for example, channel processing may include scrambling, forward error correction and modulation then partial channel processing may be limited to scrambling and the completion of the channel processing (by another partial channel processing) may include forward error correction and modulation. Alternatively, partial channel processing may be limited to scrambling and forward error correction and the completion of the channel processing (by another partial channel processing) may include modulation. Alternatively, partial channel processing may be limited to scrambling, forward error correction and performing only a part of the modulation and the completion of the channel processing (by another partial channel processing) may include another part of the modulation. FIG. 5 illustrates a channel processor 30 that includes a scrambler 31, a forward error correction (FEC) module 32 and a QAM modulator 33 for providing said channel processing operations. A channel processor that performs only some of the channel processing (for example first phase channel processor, second phase channel processors) performs only part of the channel processing and may include only a some of modules 31, 32 and 33. It is noted that a portion of the QAM modulator 33 can be included in a first phase channel processor while another part of the QAM modulator can be included in a second phase channel processor.

Referring back to FIGS. 1 and 2—distribution system 10 of FIGS. 1 and 2 includes multiple radio frequency outputs 80 and a group 70 of CPDUC units 20(1)-20(M) and a set 70 of digital to analog converters (DACs 72). M represents the number of CPDUC units in group 70.

The set 70 of digital to analog converters is connected between the group 20 of CPDUC units and the multiple radio frequency outputs. FIGS. 1-2 illustrate one digital to analog converter per port of a CPDUC unit but this is not necessarily so and the number of CPDUC unit ports may differ from the number of digital to analog converters.

The group 20 of CPDUC units may be arranged to generate multiple digital multiplexes and to provide the multiple digital multiplexes to the set 70 of digital to analog converters.

FIG. 1 illustrates that each CPDUC unit has multiple (n) branches—each branch has its own port. Thus, CPDUC unit 20(1) has n branches 20(1,1)-20(1,n), CPDUC unit 20(2) has n branches 20(2,1)-20(2,n) and CPDUC unit 20(M) has n branches 20(M,1)-20(M,n). There are overall N branches, N being a positive integer that equals n×M.

It is noted that different CPDUC units have the same number of branches and/or ports but that one or more CPDUC units may differ from each other by the number of branches and/or ports.

Each CPDUC unit of the group 20 may generates a same number of digital broadcast channels as any other CPDUC unit of the group. Alternatively, at least two CPDUC units of the group 20 may differ from each other by a number of digital broadcast channels generated by each one of the at least two CPDUC units.

A digital multiplex may include one or more digital broadcast channels, one or more digital narrowband channel or a combination thereof. Conveniently, each digital multiplex includes digital broadcast channels provided from at least two CPDUC units. FIG. 1 illustrates CPDUC units that receive digital broadcast channels from their adjacent CPDUC units—so that each digital multiplex includes digital broadcast channels from three CPDUC units.

FIG. 2 illustrates that each CPDUC unit received digital broadcast channels from all other CPDUC units—so that each digital multiplex includes digital broadcast channels from all (M) CPDUC units. Each digital broadcast channel may be sent, after being digital to analog converted by a digital to analog converter of the set, to each one of the multiple radio frequency outputs 80.

The set 70 of the digital to analog converters may be arranged to convert the multiple digital multiplexes to provide multiple analog multiplexes. The multiple analog multiplexes are provided to the multiple radio frequency outputs 80.

The multiple radio frequency outputs 80 may be coupled to a distribution network such as a fiber network, a hybrid coax fiber network, and the like. Each analog multiplex may be eventually fed to a different sub-network such as a local network connected to a group of houses.

The distribution system 10 may receive input information that is then channel processed to provide broadcast and/or narrowband digital channels.

FIG. 3 illustrates a branch 20(1,1) of a CPDUC unit according to an embodiment of the invention.

Each CPDUC unit may include one or more branches. Each branch may output a single digital multiplex via a single port of the CPDUC unit. It is noted that different branches of the same CPDUC unit may exchange some of the digital broadcast channels and/or digital narrowband channels. Alternatively—one or more branch may receive outer digital channels only from other CPDUC units.

The branch 20(1,1) outputs an digital multiplex that includes (a) X inner digital broadcast channels, (b) Y inner digital narrowband channels, and (c) a plurality of outer digital broadcast channels.

Branch 20(1,1) illustrates a channel processing process that includes two phases. It is noted that the number of phases may exceed two (and the channel processing operations may be executed by more than two different partial channel processors). Accordingly channel processing operations such as Branch 20(1,1) receives the plurality of outer digital broadcast channels that are partially channel processed and complete the channel processing. Branch 20(1,1) includes:

a. X phase one broadcast channel processors ("First phase BBCP") 11(1)-11(X) for generating partially processed X inner digital broadcast channels.

b. X phase two broadcast channel processors ("Second phase BBCP") 13(1)-13(X) for receiving the partially processed X inner digital broadcast channels and completing the channel processing to provide fully processed inner digital broadcast channels.

c. A plurality of phase two broadcast channel processors ("Second phase outer BBCP") 15 for receiving a plurality of partially processed outer digital broadcast channels and completing the channel processing to provide fully processed outer digital broadcast channels.

d. Y phase one narrowband channel processors ("First phase NBCP") 12(1)-12(Y) for generating partially processed Y inner digital narrowband channels.

e. Y phase two narrowband channel processors ("Second phase NBCP") 14(1)-14(Y) for receiving the partially processed Y inner digital narrowband channels and completing the channel processing to provide fully processed inner digital narrowband channels.

f. A router 16 that is coupled between all the phase two channel processors (13(1)-13(X), 14(1)-14(Y) and 15) and between the digital up converter 18, for providing different digital channels to different inputs of the digital up converter 18 thereby determining the up conversion frequencies of the channels.

g. A digital up converter 18 for generating a digital multiplex that includes channels that are frequency up-converted to different frequencies.

FIG. 3 illustrates that all the partially processed X inner digital broadcast channels are sent to one or more other CPDUC units. It is noted that only part (or even none) of these inner digital broadcast channels can be sent to one or more other CPDUC units.

FIG. 4 illustrates branch 20(2,1) of a CPDUC unit according to an embodiment of the invention.

The branch 20(2,1) outputs an digital multiplex that includes (a) X inner digital broadcast channels, (b) Y inner digital narrowband channels, and (c) a plurality of outer digital broadcast channels.

Branch 20(2,1) illustrates a channel processing process that includes a single phase.

Branch 20(2,1) receives a plurality of outer digital broadcast channels that are fully channel processed.

Branch 20(2,1) includes:

a. X broadcast channel processors ("BBCP") 21(1)-21(X) for generating fully processed X inner digital broadcast channels.

b. Y narrowband channel processors ("NBCP") 22(1)-22(Y) for generating fully processed Y inner digital narrowband channels.

c. A router 16 that is coupled between all the channel processors (21(1)-21(X), 22(1)-22(Y)) and between the digital up converter 18, for providing different digital channels to different inputs of the digital up converter 18 thereby determining the up conversion frequencies of the channels.

d. Digital up converter 18 for generating a digital multiplex that includes channels that are frequency up-converted to different frequencies.

Router 16 receives Y inner digital narrowband channels, X inner digital broadcast channels and a plurality of outer digital broadcast channels.

FIG. 4 illustrates router 16 as including z inputs 16(1,1)-16(1,Z) and less than Z outputs 16(2,1)-16(2,W). Digital up converter 18 is illustrated as having W inputs 18(1,1)-18(1, W). In this case each input of the digital up converter 18 may receive a time division multiplex of digital channels.

Different digital up converter 18 inputs are associated with different frequency ranges. An order of provision of samples of narrowband samples to each digital up converter input of the multiple DUC inputs may determine an allocation of frequencies by the digital up converter to the samples of the narrowband channels within a frequency range associated with the digital up converter input.

It is noted that the number of router inputs may equal the number of router outputs.

FIG. 6 illustrates branch 20(M,3) of a CPDUC unit according to an embodiment of the invention.

The branch 20(M,3) outputs an digital multiplex that includes (a) a plurality of inner digital broadcast channels, (b) a plurality of inner digital narrowband channels, and (c) a plurality of outer digital broadcast channels.

Branch 20(M,3) illustrates a channel processing process that includes a single phase.

Branch 20(M,3) receives a plurality of outer digital broadcast channels 44 that are fully channel processed.

Branch 20(M,3) includes:
a. A multi-channel broadcast channel processor 41 for generating a plurality of fully processed inner digital broadcast channels.
b. A multi-channel narrowband channel processor 42 for generating a plurality of fully processed inner digital narrowband channels.
c. A port and/or common process unit 43 that receives the plurality of fully processed inner digital broadcast channels, the plurality of fully processed inner digital narrowband channels and a plurality of fully processed outer digital narrowband channels 44 and processes these channels to provide a digital multiplex. The processing may include frequency up conversion and any other digital domain process.

FIG. 6 illustrates that all the partially processed inner digital broadcast channels 45 are sent to one or more other CPDUC units. It is noted that only part (or even none) of these inner digital broadcast channels can be sent to one or more other CPDUC units.

Figure 7:
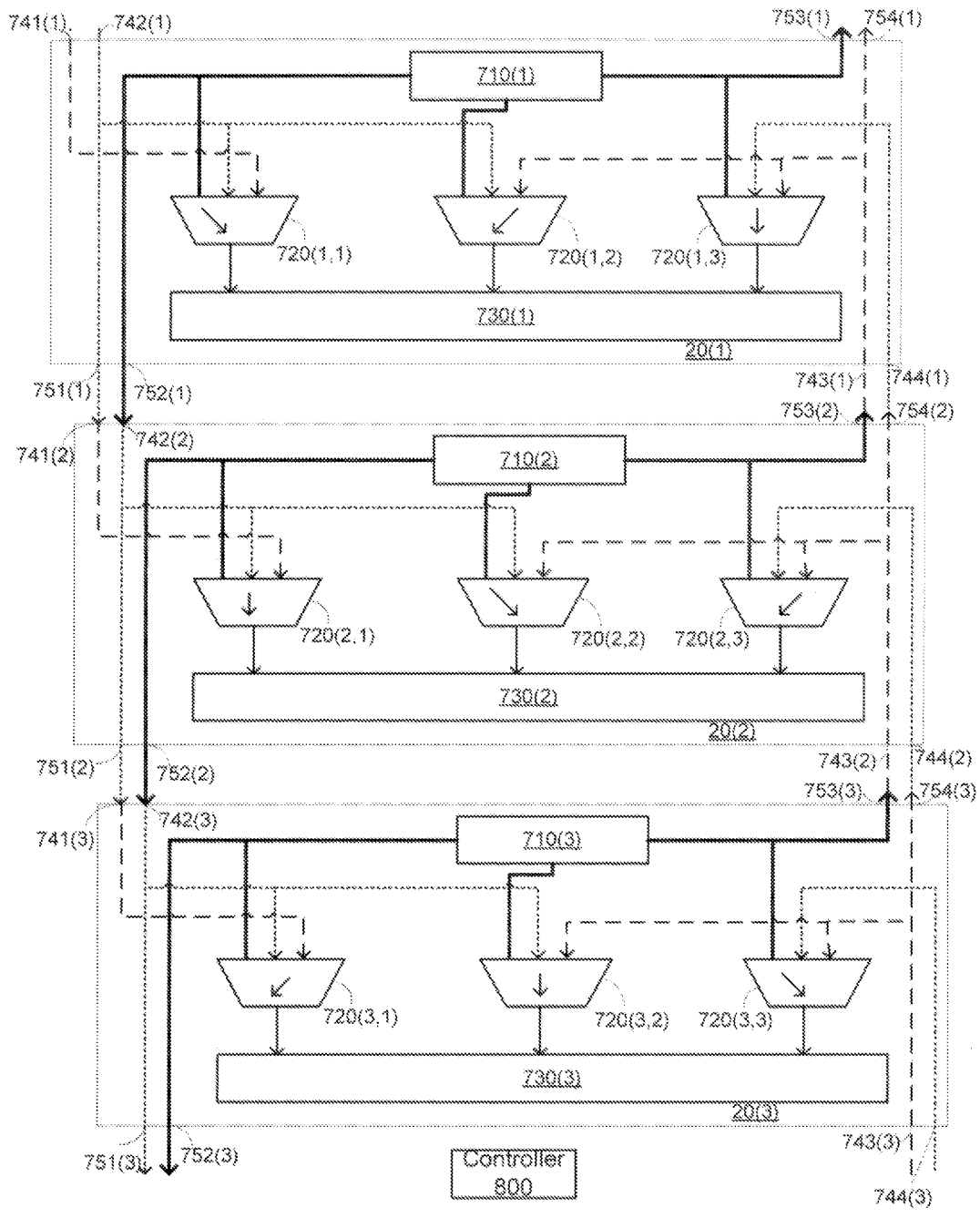
FIG. 7 illustrates a portion of a system according to an embodiment of the invention.

FIG. 7 illustrates a modular arrangement of three CPDUC units 20(1), 20(2) and 20(3) according to an embodiment of the invention.

It is assumed, for simplicity of explanation, that CPDUC units 20(1), 20(2) and 20(3) generate only digital broadcast channels.

This arrangement is termed modular because all three CPDUC units 20(1), 20(2) and 20(3) have the same components, are configurable and may receive the same signals.

For example, the multiplexers of each of the CPDUC units 20(1), 20(2) and 20(3) receive different selection signals (not shown—represented by arrows)—so that each multiplexer receives signals from the same CPDUC unit.

The leftmost multiplexers (720(1,1), 720(2,1) and 720(3, 1)) of the different CPDUC units are configured differently—in order to output the signals outputted from digital broadcast channel generator 710(1) of CPDUC unit 20(1).

The rightmost multiplexers (720(1,3), 720(2,3) and 720 (3,3)) of the different CPDUC units are configured differently—in order to output the signals provided from digital broadcast channel generator 710(3) of CPDUC unit 20(3).

The middle multiplexers (720(1,2), 720(2,2) and 720(3, 2)) of the different CPDUC units are configured differently—in order to output the signals provided from digital broadcast channel generator 710(2) of CPDUC unit 20(2).

It is noted that the CPDUC's units may be arranged in a non-modular manner.

CPDUC units 20(1), 20(2) and 20(3) include:
a. Digital broadcast channel generators (710(1), 710(2) and 710(3) respectively) arranged to generate inner digital broadcast channels.
b. Digital broadcast channel inputs (741(1)-744(1), 741 (2)-744(2) and 741(3)-744(3) respectively) for receiving four sets of outer digital broadcast channels from two other CPDUC units of the group.
c. Digital broadcast channel outputs (751(1)-754(1), 751 (2)-754(2) and 751(3)-754(3) respectively) for outputting four sets of inner digital broadcast channels from two other CPDUC units of the group.
d. Interfacing units that includes multiplexers (720(1,1)-720(1,3), 720(2,1)-720(2,3) and 720(3,1)-720(3,3)), routing and/or processing unit (730(1), 730(2) and 730(3)) and links that connect the various components (including input and/or outputs) of the CPDUC units 20(1), 20(2) and 20(3).

The routing and/or processing units may include, for example, channel processors, routers, and/or post and/or common process unit 43 of FIG. 6.

Digital broadcast channel inputs 741(1) and 742(1) are connected to digital broadcast channel outputs 751(3) and 752(3).

Digital broadcast channel inputs 743(3) and 744(3) are connected to digital broadcast channel outputs 753(1) and 754(1).

Digital broadcast channel inputs 741(2) and 742(2) are connected to digital broadcast channel outputs 751(1) and 752(1).

Digital broadcast channel inputs 743(1) and 744(1) are connected to digital broadcast channel outputs 753(2) and 754(2).

Digital broadcast channel inputs 741(3) and 742(3) are connected to digital broadcast channel outputs 751(2) and 752(2).

Digital broadcast channel inputs 743(2) and 744(2) are connected to digital broadcast channel outputs 753(3) and 754(3).

Figure 8:
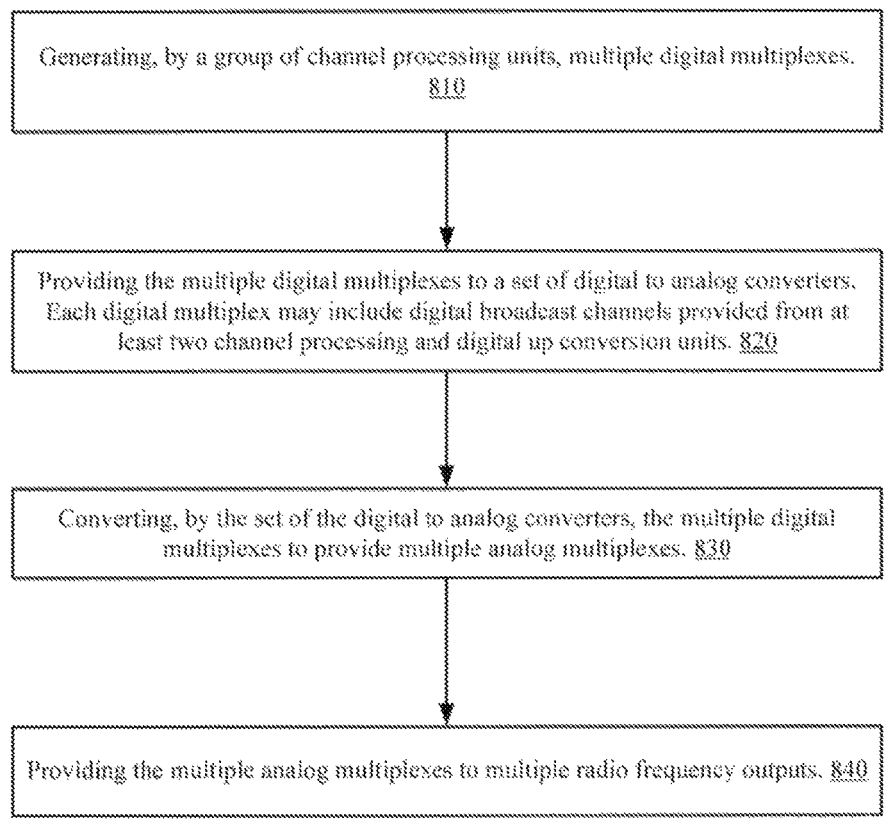
FIG. 8 illustrates a method according to an embodiment of the invention.

FIG. 8 illustrates method 800 according to an embodiment of the invention.

Method 800 may start by stage 810 of generating, by a group of channel processing units, multiple digital multiplexes.

Stage 810 may be followed by stage 820 of providing the multiple digital multiplexes to a set of digital to analog converters. Each digital multiplex may include digital broadcast channels provided from at least two channel processing and digital up conversion units.

Stage 820 may be followed by stage 830 of converting, by the set of the digital to analog converters, the multiple digital multiplexes to provide multiple analog multiplexes.

Stage 830 may be followed by stage 840 of providing the multiple analog multiplexes to multiple radio frequency outputs.

In the foregoing specification, the invention has been described with reference to specific examples of embodiments of the invention. It will, however, be evident that various modifications and changes may be made therein without departing from the broader spirit and scope of the invention as set forth in the appended claims.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A distribution system for digital video, comprising:
multiple radio frequency outputs;
a group of channel processing and digital up conversion units; and
a set of digital to analog converters,
wherein the set of digital to analog converters is coupled between the group of channel processing and digital up conversion units and the multiple radio frequency outputs,
wherein the group of channel processing units is arranged to generate multiple digital video multiplexes and to provide the multiple digital video multiplexes to the set of digital to analog converters; wherein each digital video multiplex comprises digital video broadcast channels provided from at least two channel processing and digital up conversion units,
wherein the set of the digital to analog converters are arranged to convert the multiple digital video multiplexes to provide multiple analog video multiplexes and to provide the multiple analog video multiplexes to the multiple radio frequency outputs, wherein each of the multiple radio frequency outputs carries a plurality of video channels, and wherein said plurality of video channels comprises one or more narrowcast video channels and one or more broadcast video channels.

2. The distribution system according to claim 1, wherein the group of channel processing units and digital up conversion units is arranged to output multiple digital video broadcast channels so that each digital video broadcast channel is sent, after being digital to analog converted by a digital to analog converter of the set, to each one of the multiple radio frequency outputs.

3. The distribution system according to claim 1, wherein channel processing units and digital up conversion units of the group are arranged to distribute multiple digital video broadcast channels between the channel processing units and digital up conversion units of the group.

4. The distribution system according to claim 1, wherein each digital video multiplex comprises digital video broadcast channels provided from each one of the channel processing and digital up conversion units of the group.

5. The distribution system according to claim 1, wherein channel processing units and digital up conversion units of the group are arranged to distribute partially channel processed digital video broadcast channels between the channel processing units and digital up conversion units of the group.

6. The distribution system according to claim 1, wherein channel processing units and digital up conversion units of the group are arranged to generate partially channel processed digital video broadcast channels by performing at least one out of scrambling, forward error correction and a portion of channel modulation.

7. The distribution system according to claim 1, wherein each digital video multiplex comprises at least one narrowband channel.

8. The distribution system according to claim 1, wherein each channel processing and digital up conversion unit of the group comprises:
digital video broadcast channel generators arranged to generate inner digital broadcast video channels;
at least one digital video broadcast channel input for receiving at least one input digital video broadcast channels from at least one other channel processing and digital up conversion units of the group;
at least one digital video broadcast channel output for outputting at least one inner digital video broadcast channel to one or more other channel processing and digital up conversion units of the group; and
an interfacing unit that is arranged to receive a plurality of digital video broadcast channels that comprises the inner digital video broadcast channels and the at least one input digital video broadcast channels and to provide the plurality of digital video broadcast channels to a digital up converter unit of the channel processing and digital up conversion unit.

9. The distribution system according to claim 8, wherein different channel processing and digital up conversion units of the group have a same configuration; wherein a configuration of a channel processing and digital up conversion units is indicative of at least a connectivity between the digital video broadcast channel generators, the at least one digital video broadcast channel input, the at least one digital video broadcast channel output and the interfacing unit.

10. The distribution system according to claim 8, wherein the interfacing unit comprises a router; wherein the router comprises multiple router inputs, multiple router outputs and a routing circuit coupled between the multiple router inputs and the multiple router outputs; wherein the multiple router outputs are coupled to multiple digital up converter inputs of a digital up converter unit of the channel processing and digital up conversion units; wherein the different digital up converter (DUC) inputs are associated with different frequency ranges.

11. The distribution system according to claim 10, wherein an order of provision of samples of narrowband samples to each digital up converter (DUC) input of the multiple digital up converter (DUC) inputs determines an allocation of frequencies by the digital up converter (DUC) to the samples of the narrowband channels within a frequency range associated with the digital up converter (DUC) input.

12. The distribution system according to claim 1, wherein the channel processing and digital up conversion units of the group comprise quadrature amplitude modulation (QAM) modulators.

13. The distribution system according to claim 1, wherein each channel processing and digital up conversion unit of the group generates a same number of digital video broadcast channels as any other channel processing and digital up conversion unit of the group.

14. The distribution system according to claim 1, wherein at least two channel processing and digital up conversion units of the group differ from each other by a number of digital video broadcast channels generated by each one of the at least two channel processing and digital up conversion units.

15. A method for distributing digital video broadcast channels, comprising:

generating, by a group of channel processing units, multiple digital video multiplexes;

providing the multiple digital video multiplexes to a set of digital to analog converters; wherein each digital video multiplex comprises digital video broadcast channels provided from at least two channel processing and digital up conversion units;

converting, by the set of the digital to analog converters, the multiple digital video multiplexes to provide multiple analog video multiplexes; and providing the multiple video analog multiplexes to multiple radio frequency outputs, wherein each of the multiple radio frequency outputs carries a plurality of video channels, and wherein said plurality of video channels comprises one or more narrowcast video channels and one or more broadcast video channels.

16. The method according to claim 15, further comprising:

outputting multiple digital video broadcast channels so that each digital video broadcast channel is sent, after being digital to analog converted by a digital to analog converter of the set, to each one of the multiple radio frequency outputs.

17. The method according to claim 15, further comprising:

distributing multiple digital video broadcast channels between the channel processing units and digital up conversion units of the group.

18. The method according to claim 15, wherein each digital video multiplex comprises digital broadcast channels provided from each one of the channel processing and digital up conversion units of the group.

19. The method according to claim 15, further comprising:

distributing partially channel processed digital video broadcast channels between the channel processing units and digital up conversion units of the group.

20. The method according to claim 15, further comprising:

generating partially channel processed digital video broadcast channels by performing at least one out of scrambling, forward error correction and a portion of channel modulation.

\* \* \* \* \*